United States Patent [19]

Allen

[11] Patent Number: 5,040,612
[45] Date of Patent: Aug. 20, 1991

[54] APPARATUS FOR FIRE FIGHTING WITH LIQUID BALLAST IN VEHICLE TIRE OF TUBE AND TUBELESS VARIETY

[76] Inventor: William H. Allen, P.O. Box 178, Tomball, Tex. 77375

[21] Appl. No.: 576,973

[22] Filed: Sep. 4, 1990

Related U.S. Application Data

[63] Continuation of Ser. No. 428,920, Oct. 30, 1989, abandoned.

[51] Int. Cl.⁵ ............................................. A62C 3/07
[52] U.S. Cl. .............................. 169/62; 152/DIG. 5; 152/427; 280/836
[58] Field of Search .................... 169/62, 59, 9, 19; 280/836; 152/DIG. 5, DIG. 11, 429, 427

[56] References Cited

U.S. PATENT DOCUMENTS

| | | | |
|---|---|---|---|
| 2,847,049 | 8/1958 | Blomquist | 152/DIG. 5 |
| 3,169,581 | 2/1965 | Cammins | 280/836 |
| 3,637,002 | 1/1972 | Hughes | 152/429 |
| 4,062,407 | 12/1977 | Bentrup | 169/47 |
| 4,218,015 | 8/1980 | Dean | 280/836 |
| 4,364,427 | 12/1982 | Lefrancois | 152/DIG. 11 X |
| 4,811,796 | 3/1989 | Allen | 169/62 |

Primary Examiner—Joseph F. Peters, Jr.
Assistant Examiner—Christopher P. Ellis
Attorney, Agent, or Firm—Vaden, Eickenroht, Thompson & Boulware

[57] ABSTRACT

There is disclosed apparatus including an assembly of parts for use in preparing the rim of a vehicle wheel having either a tube type or tubeless tire for use in dispensing liquid in the tire to fight fire in and around the area of the vehicle.

3 Claims, 3 Drawing Sheets

FIG. 4
FIG. 5
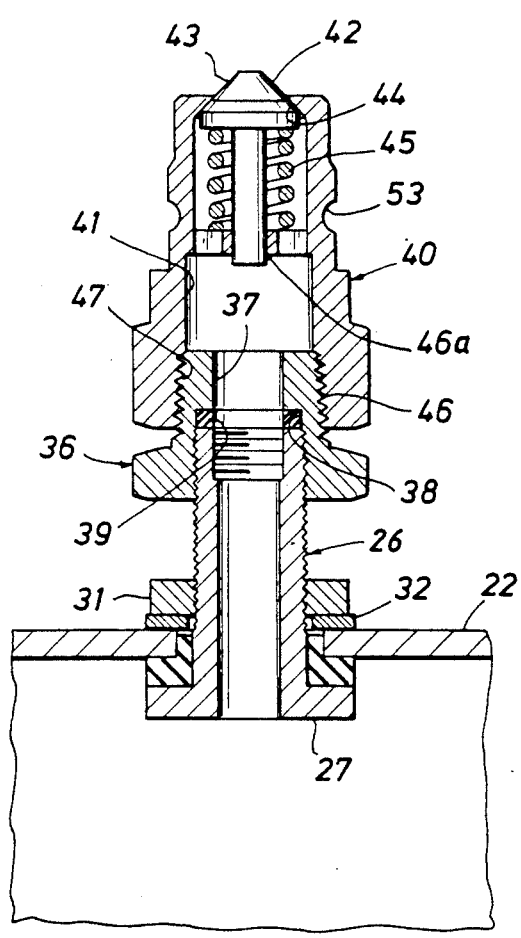
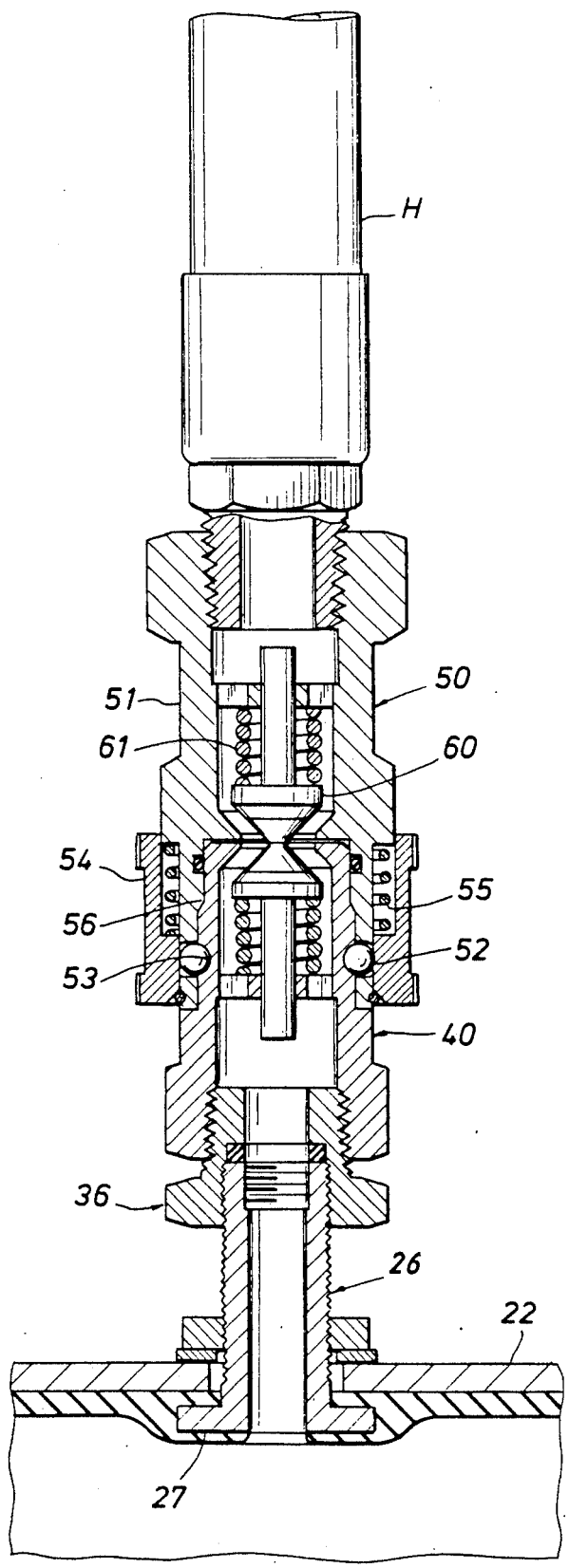

APPARATUS FOR FIRE FIGHTING WITH LIQUID BALLAST IN VEHICLE TIRE OF TUBE AND TUBELESS VARIETY

CROSS-REFERENCE TO RELATED APPLICATION

This invention is a continuation of my copending application, Ser. No. 07/428,920, filed Oct. 30, 1989, and entitled "Fire Fighting Apparatus" abandoned.

FIELD OF THE INVENTION

This invention relates generally to apparatus for use in fighting fire in and around off the highway type vehicles having tires in which a liquid ballast may be contained. More particularly, it relates to improvements in apparatus of this type wherein the fire may be extinguished by means of the liquid ballast.

Various heavy duty, self-propelled vehicles of this type, including those used in the timber, farm and construction industries, are typically powered by diesel fuel and of such a size as to require the use of rubber tires containing a liquid ballast and weight in many hundreds of pounds and costing thousands of dollars each. In the course of normal operation, leaking diesel fuel oil and fumes may be mixed with leaves and other debris drawn into the engine compartment. This mixture of debris and oil, when brought into contact with a hot exhaust manifold, often results in fires that cannot be extinguished with small portable fire extinguishers alone.

Heavy vehicles of this type typically rely upon the use of disc brakes, and on many occasions, these brakes tend to stick or otherwise not completely release during use, thereby causing a substantial build-up of frictional heat. Inasmuch as the disc brakes may be designed to run through a reservoir of oil, this heat may cause the oil to flash into a fire when the vehicle is stopped. Also, of course, even if they don't cause fires, hot brakes and bearings may require water cooling.

When these fires, whether caused by hot brakes or engine compartment debris or otherwise, spread to the rubber tires, a particularly serious problem is created since rubber tires are extremely difficult to extinguish. Even if a portable fire extinguisher is utilized to put out such a fire, the tremendous heat retention of the rubber often causes the tire to burst into flames again. Only after a deep cooling of the hot rubber will this continuing "flash" fire effect be eliminated. As can be appreciated, this requires the use of a substantially large amount of a quenching liquid before an adequate cooling of the heated surfaces can be accomplished.

DESCRIPTION OF THE PRIOR ART

One of the current and most often used means for fighting such fires is a tank of fire fighting liquid secured to the top of the operator cab. Typically, these tanks are quite heavy, and require various air, water and pressure release valves within the operator compartment, as well as a substantial length of coiled, water delivery hose.

As will be appreciated, the tanks substantially increase the height of the vehicle to the point that it may experience difficulty in passing underpasses, various tree limbs and similar obstructions. Frequently, the tanks are damaged or torn away from the carrying vehicle when a operator fails to notice the presence of such an obstruction.

An overhead mounted water tank is of limited water-carrying capacity, since too large a volume of water would result in the vehicle becoming overly top-heavy. In this regard, any amount of water stored on the roof of the operator cab will create some top-heaviness, which in turn could contribute to an overturning of the vehicle, especially where a slipping terrain is involved.

The tank is also quite expensive and is subject to vandalism, including destruction vandalism. Also, the associated fire fighting hose is particularly attractive to vandals. The cost of continually repairing or replacing damaged or stolen water tanks, whether caused by vandalism or by striking overhead objects, is prohibitive.

These fires may occur very quickly and spread very rapidly, whereby an operator may have very little time to escape from the cab if a fire were to reach that area. Accordingly, a cab-mounted water tank may, in many cases, prove to be useless since the operator does not have time to go through the operation of uncoiling the water supply hose and to actuate the needed valves to permit a dispensing of the water in the tank.

Because of these risks, insurers may require the operator to carry large fire extinguishing equipment in addition to cab-mounted water tank. Unfortunately, operators of such vehicles frequently remove the extinguishers from a cab since they are prone to breaking loose under difficult operating conditions.

Bentrup U.S. Pat. No. 4,062,407 discloses a wheel of a vehicle having a tire provided with four equally circumferentially spaced fittings or valves, and a pair of hoses each having a coupling on one end for "quick" connection to an disconnection from one of the valves. The opposite end of one hose is shown connected to a tank or container of compressed gas, and the other hose is shown to have a nozzle on its opposite end. More particularly, the first such hose is adapted to be coupled to an upper valve of the tire above the level of liquid ballast in the tire, and a second is adapted to be coupled to a lower valve below the liquid ballast level. Thus, a valve on the tank may be opened to pressurize the ballast liquid so that, upon opening of the nozzle on the other hose, liquid may be dispensed from the tire for use in fighting a fire in and around the vehicle.

As a practical matter, the tank is of such size and weight as to make it difficult if not impossible to store on the vehicle, much less permit it to be handled easily and quickly by a person or persons in and around the vehicle, particularly under emergency conditions. Also, of course, without an expensive regulator on the tank, gas could be supplied to the tire at a pressure which could cause it to explode, and without a gauge, the vehicle operator has no way of knowing whether or not the gas within the tank is at a require pressure.

U.S. Pat. No. 4,811,796, issued to Stephen D. Allen on Mar. 14, 1989, relates to apparatus including an assembly of parts which provides a means of fighting fires of this type which overcomes these and other problems inherent in the use of the Bentrup apparatus. Thus, it includes a wheel having a rim on which a tubeless tire is adapted to be mounted and means forming a plurality of holes spaced generally equally about he rim to connect with the interior of the tire, and a plurality of fittings each having means for connection to a hole forming means with a bore therethrough adapted to open to the tire, when so connected, and an inwardly facing seat about he bore and a closure member yieldably urged toward a seated position to close the bore. More particularly, the apparatus further includes a plurality of couplings each of which is adapted to be moved into an inner position within the outer end of the bore of a fitting to engage and move the closure member to an unseated position, and each fitting and coupling having means thereon adapted to releasably attach the coupling to the fitting in its inner position.

More particularly, each such coupling has a bore therethrough which opens to the fitting bore when attached thereto and means on its outer end to which a first hose may be connected in order to permit liquid to be added to the tire as air is vented from the tire through another coupling connected to another fitting, or to which an adapter having a valve stem therein may be connected to receive air from an air hose in order to pressurize the liquid in the tire while the other coupling is removed from the other fitting to permit it to hose, or to which a second hose having a nozzle on its outer end maybe connected in order to dispense the pressurized liquid from the tire upon opening of the nozzle, again of course, while the other fitting is closed. Hence, it is possible to fight the fire with air pressure normally used in the tires of such vehicles, and thus without the need of a large tank of gas, at a pressure which, if not controlled, could seriously injure personnel in and around the vehicle. Furthermore, this is made possible with an assembly of parts including fittings connecting with the interior of ht tire in such a manner that they may be replaced or repaired without the necessity of removing the tire from the rim of the wheel.

Although a substantial improvement over Bentrup and other prior art in these respects, the apparatus of U.S. Pat. No. 4,811,796 is of limited use in several respects. For one thing, it is adapted for use only with vehicles having tubless tires. Also, it requires that the rim of each wheel, and preferably the rims of at least two of the wheels be modified and thus prefabricated, prior to acquisition by the user, to from the holes thereabouts. Still further, it requires a relatively large number of parts which a user must obtain along with the specially fabricated wheel and rim.

It is therefore the object of this invention to provide apparatus of this general type which not only overcome many of the problems inherent in the Bentrup apparatus, but also overcomes those shortcomings abovenoted with respect to the apparatus and assembly of parts of U.S. Pat. No. 4,811,796, and, in particular, which is usable with wheels having rims for either tube or tubless tires, which does not require that the wheel be modified and thus prefabricated, and further in which the assembly need comprise only a small number of relatively simple, prefabricated parts.

SUMMARY OF THE INVENTION

This and other objects are accomplished, in accordance with the illustrated embodiment of the apparatus, by means of apparatus including an assembly of parts which takes advantage of the fact that the rims of standard wheels for such vehicles are similar, whether for use with tubeless or tube type tires, in that each has a hole through which a housing extends to enable air and/or water maybe supplied to or exhausted from the tire, the housing normally having a valve stem installed therein to permit filling of the tire with air through a core in the stem, or, alternatively, upon removal of the stem to permit water ballast to be supplied to or exhausted from the tire.

More particularly, and as well known in the art, the valve stem housing has a straight thread thereabout over which a nut is threaded to comprise a flange on the inner end of the hose against a body of rubber into sealing engagement with an area in the inner side of the rim about the hole to close same. In the case of tubeless tire, this rubber body comprises a gasket which first between the flange and the area of the rim surrounding the hole, and, in the case of a tube type tire, this rubber body comprises an annular area of the tube which surrounds a hole through which the inner end of the stem extends and to which the flange thereof is molded during manufacture of the tube.

In either case, however, the housing and the size of the threads over which the nut is threaded are identical, and, in accordance with the presence invention, the assembly of parts includes a tubular adapter having straight threads about its inner diameter for threadedly engaging the straight threads on the outer end of the housing, when the valve stem has been removed therefrom, and whether the tire is tubeless or tube type, a gasket for sealing between the adapter and housing as the adapter is threadedly connected to the housing, and a fitting having a bore therethrough and tapered threads about its bore for threadedly engaging the tapered threads about the adapter whereby with the valve stem removed from the house, the bore of the fitting is open to the adapter and housing. The fitting has a seat about its bore, a closure member yieldable urged to a seated position to close the bore and means to which the tapered threads of other fittings having bores therethrough may be releasably connected in order to permit a fire fighting liquid and air to be supplied to the tire and such liquid to be dispensed therefrom through hoses connected with the fittings. Thus, the invention also takes advantage of the fact that fittings or quick couplings of this general type are conventionally provided with tapered threads which connect them in sealed relation, upon making up of the threads of the fittings.

In its preferred form, the invention further contemplates that the apparatus will include a hose having a fitting at one end for releasable connection to the fitting on the adapter on the rim and a nozzle on its other end to provide a large area through the housing from which the insert has been removed to permit large volumes of the liquid to be supplied to the area to be controlled as well as to fill or exhaust such liquid. If desired, adapters and fittings may be installed on two or more of the wheel rims, whereby the user has a choice of dispensing from one or more wheels whose adapter and fitting is best located circumferentially for dispensing purposes. Although, in any case, however, only one dispensing hose is required. Furthermore, and as suggested in U.S. Pat. NO. 4,811,796, the tire or tires may be initially filled with the liquid through a standard garden hose or the like and then pressurized with air through a standard air line, each having a fitting on its end for connection with the fittings connected to the adapter.

BRIEF DESCRIPTION OF THE DRAWINGS

In the drawings, wherein like reference characters are used throughout to designate like parts:

FIG. 4 is a partial cross-sectional view similar to FIG. 2, but with the vale stem removed from the housing, and an adapter mounted on the outer end of the housing, with a gasket sealably engaged between it and the housing and a fitting mounted on the adapter to prepare the wheel for use in the manner contemplated by the present invention;

FIG. 5 is a partial sectional view similar to FIG. 4, showing a fitting on the inner end of the dispensing hose of FIG. 1 connected to the fitting on the adapter so as to prepare the apparatus for use in dispensing fire fighting liquid within the tire;

DESCRIPTION OF THE PREFERRED EMBODIMENT

Figure 1:
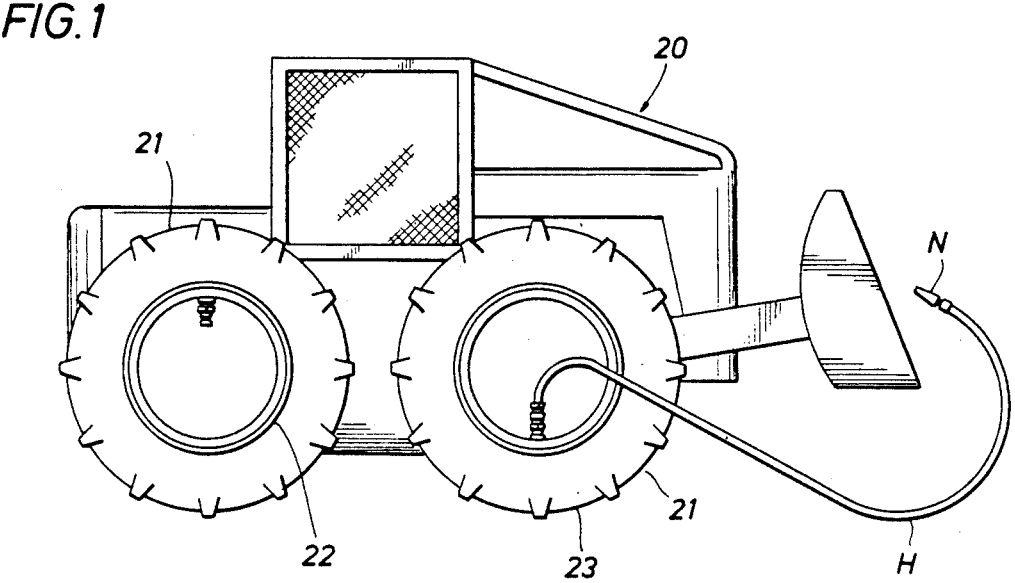
FIG. 1 is a side view of a vehicle having apparatus including parts mounted on the wheels of its rims and a hose connected to the fitting of the parts on one of the front wheels for use in dispensing fire fighting liquid.
Figure 2:
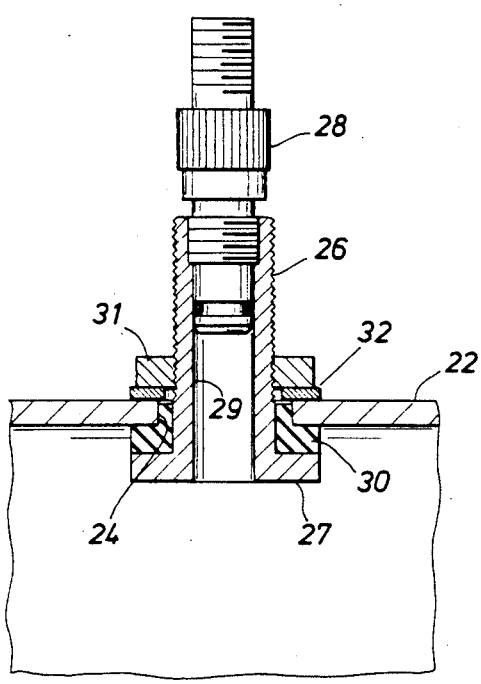
FIG. 2 is an enlarged, partial cross-sectional view of a housing and valve stem mounted on the rim of a wheel having a tubeless type tire thereon.
Figure 3:
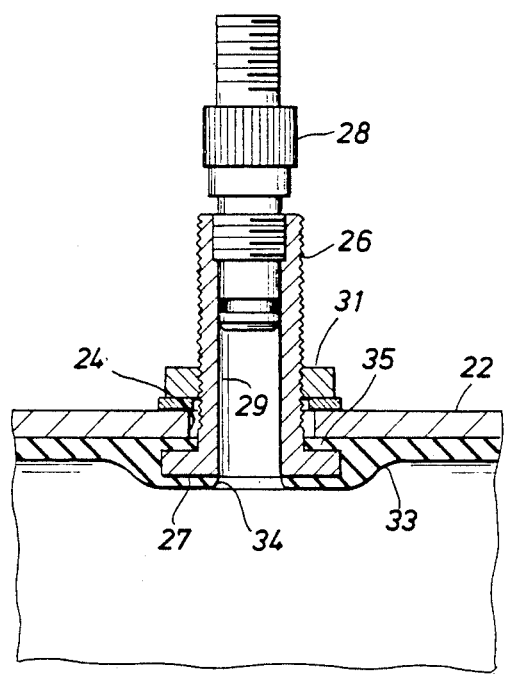
FIG. 3 is a partial cross-sectional view similar to FIG. 2, but of a wheel having a housing and valve stem mounted on a rim for a tube type tire.

With reference now to the details of the above-described drawings, the self-propelled vehicle shown in FIG. 1, and designated in its entirety by reference character 20, is shown to have wheels 21 on both sides thereof, each wheel including a rim 22 having a tire 23 thereon. Obviously, the vehicle may take many forms, as contemplated in the earlier discussion of the prior art, although, in any case, and as previously described, FIGS. 2 and 3 show a valve stem mounted on the rims of each wheel for conventional tubeless and tube type tires. In each case, the rim has a hole 24 formed therein intermediate its opposite sides and thus between the inner peripheral edges of a tubeless tire. As also previously described, a tubular housing 26 having a vale stem 28 mounted in the bore 29 therethrough extends through the hole in each rim to permit air to be supplied to or exhausted from the tire or upon removal of the stem to permit water ballast to be supplied to or emptied from the tire. As shown, each housing is of identical construction, although connected in different ways to the interior of the tire depending on whether it is tubeless or tube type. In each case, the tubular housing 26 has straight threads thereabout and a flange 27 on its inner end, and the stem threadly mounted in the bore 29 through the housing 26 has a core therein to provide a one-way check valve of known construction for filing the tire with air.

In the case of the rim for the tubeless tire, a gasket 30 or rubber or other elastomeric material is disposed about the housing above the flange 27 and thus beneath the area on the inner side of the rim surrounding the opening 24. In any case, this gasket is tightly compressed between the flange and the rim to close the opening 24 by means of a nut 31 having straight threads which engage with those about the housing 26 so that, when made up with the housing, it draws the flange 27 upwardly to compress the gasket 30. As also shown, a washer 32 is disposed between the nut and the inner side of the rim.

With reference to FIG. 3, the flange 27 on the inner end of the valve stem is molded within a portion 35 of the tube 33 of the tube type tire in surrounding relation to a hole 34 of the tube aligned with the bore through the rim. Thus, the portion of the tube provides a body between the stem and the surrounding area of the rim about the opening 24 which, like the gasket 30, is compressed into tight sealing engagement so as to close the opening 24.

In order to prepare the rim of the wheel, whether the tire is tubeless or tube type, for use in fighting fire in accordance with the present invention, it is necessary to first remove the valve stem 28 from within the bore 29 of the housing, as indicated in FIG. 3, and then install an adapter 36 over the outer end of the stem housing, as shown in FIG. 4. Thus, as previously described, the bore 37 through the adapter 36 has straight thread 38 at its lower end which are adapted to make up with the straight threads about the housing. More particularly, the assembly of parts also includes a gasket 39 which is installed between a counterbore in the adapter and outer end of the housing 26 so as to from a seal therebetween and thus provide a sealed continuation between the bore 37 and the bore 29. Thus gasket may of course be carried within a counterbore 38 in the bore of the adapter for seating upon the outer end of the housing and is of the same diameter as the bore 37 and the bore of the housing.

As also previously described, the assembly of parts according the present invention also includes a fitting 40 having a bore 41 therethrough and adapted to be threadedly connected to the outer end of the adapter 36 to form a continuation thereof. More particularly, the fitting 40 includes a closure member 42 having a head 43 adapted to sealably engage a tapered seat 44 on the outer end of the bore 41 of the fitting when yieldably urged thereagainst by means of coil spring 45 compressed between the closure member and a cage 46 installed across the bore 41 of the fitting.

As will be understood from the foregoing description, the fitting may be of conventional construction and adapted to cooperate with another fitting to form a "quick-connect" coupling between them. In any event, it is contemplated that, as well known in the art of fittings of this type, the connection between the fitting and the adapter comprises tapered threads 46 about the outer end of the fitting adapter adapted to be threadedly engaged with tapered threads 47 on the inner end of the fitting, thus providing a sealed connection between the adapter and fitting when the fitting is fully made up with the adapter. As shown in FIG. 5, the complimentary fitting 50 of such a coupling is connected to the inner end of the fill hose H, as shown in FIG. 1, so that, with the fitting 50 of the fill hose made up with the fitting 40, fire fighting equipment may be dispensed from the tire through the nozzle end N.

Although other suitable fittings and coupling constructions may be used for this purpose, the one illustrated comprises a housing 51 having a bore therethrough of substantially the same size as the bore 41 through the fitting 40 and adapted to be releasably connected thereto by means of balls 52 carried by the end of the hosing for releasably engaging within grooves 53 about the housing 50 of fitting 40. For this purpose, and as well known in the art, the balls are moved into locking position by means of a sleeve 54 slidable over the outer side of the fitting 51 and yieldably urged to locking position by means of a coil spring 55 compressed between the oppositely facing shoulders on the housing and sleeve. Thus, during assembly, the sleeve may be withdrawn upwardly to move an inner portion 56 of the housing 50 downwardly in the telescoping relation over the outer end of the housing of the fitting 40, and then released to permit it to be urged downwardly by the springs 55 to form the balls into locking engagement with the housing 40.

More particularly, the fitting 50 includes a closure member 60 similar to the closure member 42 of the fitting 40 and thus protruding from the lower end of he bore through the housing 50, and spring pressed toward that position by means of coil sprigs 61. Thus, as the fittings are connected to one another, the head 60 engages the upwardly protruding portion of the head 42 to move it downwardly to the open position shown in FIG. 5, whereby the bores through the fittings and 40 and 50 are connected to one another.

Figure 6:
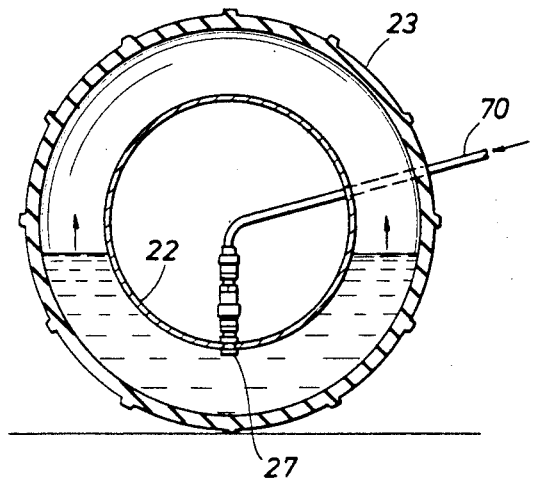
FIG. 6 is a cross-sectional view of a wheel having a tubeless tire, as shown in FIG. 2, but with a hose having a fitting on its inner end connected to the fitting on the adapter for use in filling the tire to a desired extent with fire fighting liquid.
Figure 7:
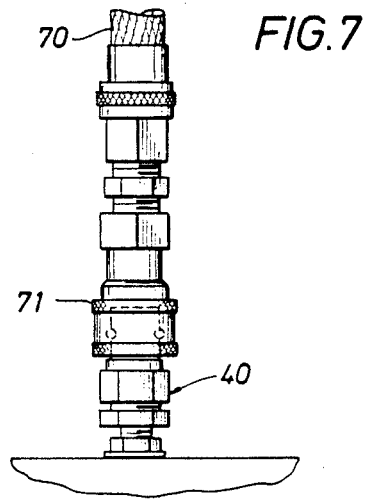
FIG. 7 is an enlarged elevational view of the adapter and fitting installed on the tubeless tire, and a fitting on the inner end of the fill hose connected to the fitting on the adapter, as shown in FIG. 6.

As shown in FIGS. 6 and 7, the fill hose 70, which may be a conventional garden hose, has a fitting 71 on its inner end which may be identical to the fitting 50 for connecting with the fitting 40 in order to at least partially fill the tire with fire fighting liquid from a suitable source to which the hose 70 is connected.

Figure 8:
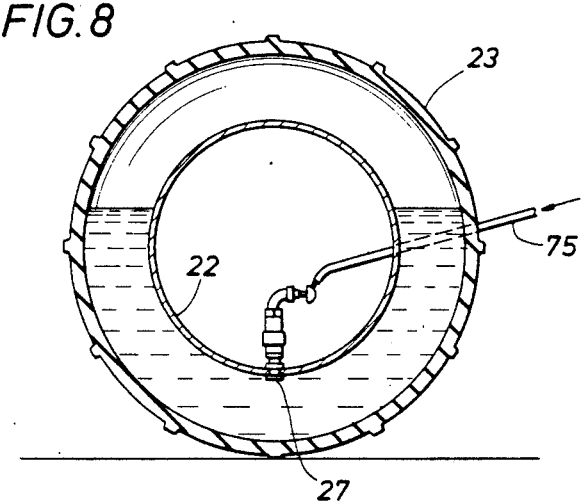
FIG. 8 is a cross-sectional view of a tire, similar to FIG. 6, but with the tire partially filled with fire fighting liquid, and with a fitting installed on the fitting mounted on the adapter and the inner end of an air line connected to the outer fitting for supplying air to the interior of the tire and thus pressurizing the fire fighting liquid therein.
Figure 9:
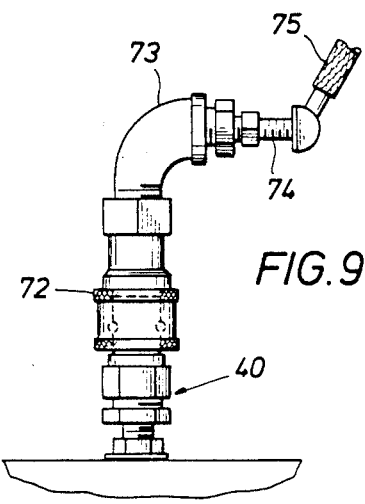
FIG. 9 is an enlarged view of the adapter and fitting on the rim of the wheel, together with an additional fitting on the inner end of an air line connected thereon, as shown in FIG. 8.

As illustrated in FIGS. 8 and 9, when the tire has been filled with fire fighting liquid to the desired level, the hose 70 is removed and a fitting 72 is connected to the fitting 40 of the assembly of the present invention to permit compressed air to be supplied to the interior of the tire in order to pressurize the fire fighting liquid therein. As best shown in FIG. 9, this filtrating includes an elbow 73 having an outer end 74 which maybe a valve stem of conventional construction adapted to be engaged by a conventional air hose 75 connecting with a suitable source of compressed air.

Figure 10:
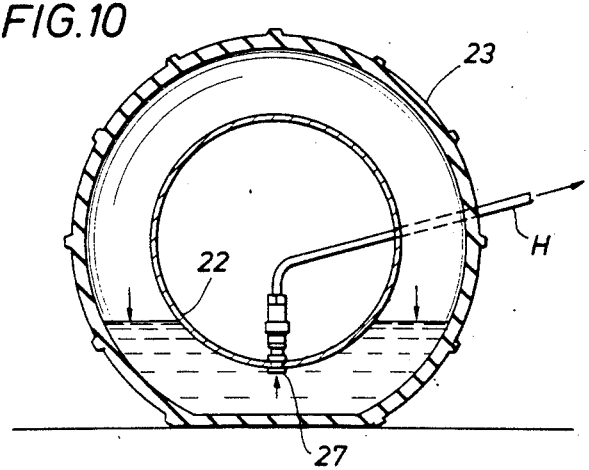
FIG. 10 is a further ross-sectional view of the tire of FIGS. 6 and 8, but with a fitting on the inner end of the dispensing hose connected to the fitting on the adapter, as in FIGS. 1 and 5, and during dispensing of the fire fighting liquid from within the tier.
Figure 11:
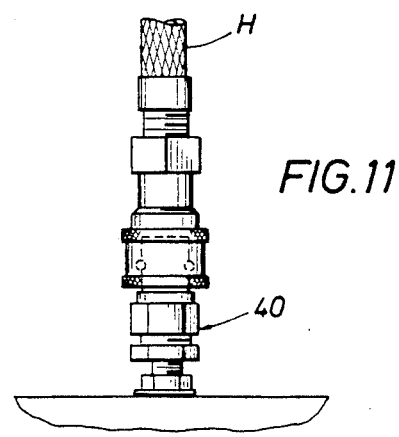
FIG. 11 is an enlarged side view of the adapter and fitting installed on the rim of the wheel, and with a fitting on the inner end of the fill hose connected to the fitting on the adapter, as shown in FIG. 10.

Finally, FIG. 10 illustrates the partial flattening of the tire as the fire fighting liquid is dispensed therefrom through the hose H whose fitting is connected to the fitting 40 as shown in FIG. 11. In this regard, it is contemplated that in the event it is necessary to empty the tire of fire fighting liquid, this may be done quickly and easily by removal of the nozzle end from the end of the hose H.

It should be noted that the large area of the opening provided through the bores 29 and 37 avoid the slow process of filling and emptying which would be experienced in the event it were necessary to do so through the core of the stem 28.

As shown in FIG. 1, the parts constructed in accordance with the present invention are mounted on the rims of at lest two of the wheels of the vehicle. Ordinarily, liquid partially filling one of the wheels will be sufficient to fight the fire. The use of a second or even third and fourth assemblies maybe helpful, however, in locating the fitting in a position near the lower end of the wheel. That is, the use of two or more such assemblies avoids the care which might otherwise be required in properly locating the assembly if a fitting were disposed or mounted on only one wheel. For this reason, it is contemplated that, in the preferred embodiment of the invention, the assembly of parts will include at least two pairs of adapters and fittings, together with a single fill hose H. This is to be compared with the large number of pair needed in the assembly of U.S. Pat. No. 4,811,796, as well as of course as the rim preparation required to receive such parts. Still further, the adapter and fitting are of such size that they, if desired, be covered by a conventional protector cap usable in protecting valve stems.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. For use in fighting fire in and around a self-propelled vehicle having tires in which a liquid ballast may be contained and mounted about a rim having a hole through which air and/or water may be supplied to or exhausted from the tire, and
   including a housing extending through the hole in the rim and a valve stem removably mounted in the house, said housing having straight threads thereboutover which a nut is threaded to compress a flange on the inner end of the housing against a body of rubber against the inner side of the rim about the hole to close same,
   an assembly of parts adapted to be assembled on the housing following removal of the stem, comprising
   a tubular adapter having straight threads about it inner diameter for threadedly engaging the straight threads on the valve stem housing and tapered threads bout its outer end,
   a gasket for sealing between the adapter and housing as the adapter is threadedly connected to the housing, and
   a fitting having a bore therethrough and tapered threads about its bore for threadedly engaging the tapered threads about the adapter to open its bore to the adapter and valve stem housing, an inwardly facing seat about its bore, a closure member yieldably urged to a seated position to close the bore, and means to which the tapered threads of hoses having fittings may be connected for use in selectively supplying the tire with fire fighting liquid, pressurizing the liquid, and then dispensing the liquid in the event of a fire, said assembly of parts being adaptable to rims for tubeless and tube-type tires, whereby no rim preparations is needed.

2. For use in fighting fire in and around a self-propelled vehicle having tires in which a liquid ballast may be contained and mounted about a rim having a hole through which air and/or water may be supplied to or exhausted from the tire, and including a hosing extending through the hole in the rim and a valve stem removably mounted in the housing, said housing having straight threads thereabout over which a nut is threaded to compress a flange on the inner end of the housing against a body of rubber against the inner side of the rim about the hole to close same, an assembly of parts adapted to be assembled on the housing following removal of the stem, comprising a tubular adapter having straight thread about its inner diameter for threadedly engaging the straight threads on the valve stem housing and tapered threads about its outer end, a gasket for sealing between the adapter and housing as the adapter is threadedly connected to the housing, and a fitting having a bore therethrough and tapered threads about its bore for threadedly engaging the tapered threads about the adapter to open its bore to the adapter and valve stem housing, an inwardly facing seat about its bore, a closure member yieldably urged to a seated position to close the bore, and means to which the tapered threads of hoses having fittings may be connected for use in selectively supplying fire fighting equipment to the tire and pressurizing the liquid at the time, and a hose having a fitting on one end for connection to the fitting on the adapter and a nozzle at its outer end through which the liquid may be dispensed, said assembly of parts being adaptable to rims for tubeless and tube-type tires, whereby no rim preparations is needed.

3. For use in fighting fire in and around a self-propelled vehicle having tires in which a liquid ballast may be contained and mounted about a rim having a hole through which air and/or water may be supplied to or exhausted from the tire, and including a housing extending through the hole in the rim and a valve stem removably mounted in the housing, said housing having straight threads thereabout over which a nut is threaded to compress a flange on the inner end of the housing against a body of rubber against the inner side of the rim about the hole to close same, an assembly of parts adapted to be assembled on the housing, comprising at least one rim having a valve stem housing from which the stem has been removed, a tubular adapter having straight threads about its inner diameter threadedly engaged with the straight threads on the stem hosing of the one rim and tapered threads about is outer end, a gasket sealably engaged between the adapter and housing, and a fitting having a bore therethrough and tapered threads about its bore for threadedly engaging the tapered threads about the adapter to open its bore to the adapter and valve stem housing, an inwardly facing seat about the bore, a closure member yieldably urged to a seated position to close the bore, and means to which the tapered threads of hoses having fittings may be connected for use in selectively supplying the tire with fire fighting liquid, pressurizing the liquid, and then dispensing the liquid in the event of a fire, said assembly of parts being adaptable to rims for tubeless and tube-type tires, whereby no rim preparations is needed.

* * * * *